United States Patent
Zhao et al.

(10) Patent No.: US 9,697,588 B2
(45) Date of Patent: Jul. 4, 2017

(54) SYSTEM AND METHOD FOR MULTI-RESOLUTION SHARPNESS TRANSPORT ACROSS COLOR CHANNELS

(75) Inventors: Wenyi Zhao, Mountain View, CA (US); Simon P. DiMaio, Sunnyvale, CA (US); David D. Scott, Oakland, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 1757 days.

(21) Appl. No.: 12/946,634

(22) Filed: Nov. 15, 2010

(65) Prior Publication Data
US 2012/0120245 A1 May 17, 2012

(51) Int. Cl.
H04N 5/33 (2006.01)
H04N 5/228 (2006.01)
G06T 5/00 (2006.01)
G06T 5/10 (2006.01)

(52) U.S. Cl.
CPC .............. *G06T 5/003* (2013.01); *G06T 5/10* (2013.01); *G06T 2207/10024* (2013.01); *G06T 2207/20016* (2013.01); *G06T 2207/20212* (2013.01)

(58) Field of Classification Search
USPC .......................................... 348/222; 382/240
See application file for complete search history.

(56) References Cited

U.S. PATENT DOCUMENTS 5,065,440 A * 11/1991 Yoshida et al. ............... 382/219
5,901,246 A * 5/1999 Hoffberg et al. ............. 382/209
6,850,252 B1 * 2/2005 Hoffberg ....................... 715/716
(Continued)

FOREIGN PATENT DOCUMENTS

WO 2010042522 A1 4/2010

OTHER PUBLICATIONS

Adelson, E.H. et al., "Pyramid methods in image processing," RCA Engineer, vol. 29-6, pp. 33-41, Nov./Dec. 1984; Internet: http://persci.mit.edu/pub_pdfs/RCA84.pdf.
(Continued)

*Primary Examiner* — Christopher S Kelley
*Assistant Examiner* — Asmamaw G Tarko

(57) ABSTRACT

Provided are a system and method for image sharpening is provided that involves capturing an image, and then decomposing the image into a plurality of image-representation components, such as RGB components for example. Each image-representation component is transformed to obtain an unsharpened multi-resolution representation for each image-representation component. A multi-resolution representation includes a plurality of transformation level representations. Sharpness information is transported from an unsharpened transformation level representation of a first one of the image-representation components to a transformation level representation of an unsharpened multi-resolution representation of a second one of the image-representation components to create a sharpened multi-resolution representation of the second one of the image-representation components. The sharpened multi-resolution representation of the second one of the image-representation components is then transformed to obtain a sharpened image. The improved and sharpened image may then be displayed.

29 Claims, 9 Drawing Sheets

(56) References Cited

U.S. PATENT DOCUMENTS

| | | | |
|---|---|---|---|
| 7,783,125 B2* | 8/2010 | Lim et al. .................... | 382/265 |
| 8,170,360 B2* | 5/2012 | Pace et al. .................... | 382/254 |
| 8,547,389 B2* | 10/2013 | Hoppe et al. ................ | 345/589 |
| 2002/0172514 A1* | 11/2002 | Gabello et al. ............... | 396/109 |
| 2003/0021599 A1 | 1/2003 | Brazas et al. ................ | 396/106 |
| 2004/0101201 A1* | 5/2004 | Sharma et al. ............... | 382/232 |
| 2005/0143662 A1* | 6/2005 | Marchitto et al. ............ | 600/473 |
| 2005/0190990 A1* | 9/2005 | Burt et al. .................... | 382/294 |
| 2007/0009176 A1* | 1/2007 | Lim et al. .................... | 382/275 |
| 2007/0053513 A1* | 3/2007 | Hoffberg ...................... | 380/201 |
| 2008/0158377 A1 | 7/2008 | Chanas et al. | |
| 2009/0086036 A1* | 4/2009 | Safaee-Rad et al. ...... | 348/208.6 |
| 2009/0096895 A1* | 4/2009 | Benezra et al. ............. | 348/234 |
| 2009/0167930 A1* | 7/2009 | Safaee-Rad et al. ........ | 348/347 |
| 2010/0129003 A1* | 5/2010 | Pace et al. .................... | 382/266 |
| 2010/0183071 A1* | 7/2010 | Segall et al. ............ | 375/240.16 |
| 2010/0254573 A1* | 10/2010 | Barlaud et al. .............. | 382/107 |
| 2010/0303348 A1* | 12/2010 | Tolliver et al. .............. | 382/164 |
| 2011/0109749 A1* | 5/2011 | Chanas et al. ............... | 348/164 |
| 2011/0211073 A1* | 9/2011 | Foster .......................... | 348/164 |
| 2011/0298953 A1* | 12/2011 | Nakamura ................... | 348/241 |
| 2012/0169842 A1* | 7/2012 | Chuang et al. ................ | 348/39 |

OTHER PUBLICATIONS

Brown, Lisa Gottesfeld, "A survey of image registration techniques," Department of Computer Science, Columbia University, New York, NY. Jan. 12, 1992, 60 pages; Internet: http://www.cs.columbia.edu/search?cx=017181709448284692436%3Acjy5gsheid4&cof=FORID%3A11&ie=UTF-8&q=cucs-004-92.ps.gz+&sa=GO#179.

Chen, Ming-Jun and Alan C. Bovik, "No-reference image blur assessment using multiscale gradient," 2009, 5 pages, Internet: http://live.ece.utexas.edu/publications/2009/mc_qomex09.pdf.

Ferzli, R. et al., "A Robust Image Sharpness Metric Based on Kurtosis Measurement of Wavelet Coefficients," 2005, 6 pages, Internet: http://enpub.fulton.asu.edu/resp/vpqm2005/papers/224.pdf.

Guichard, Frederic et al., "Extended depth-of-field using sharpness transport across color channels," Proceedings of Electronic Imaging, 2009, SPIE, 13 pages.

Laine, Andrew F. et al., "Mammographic Feature Enhancement by Multiscale Analysis," IEEE Transactions on Medical Imaging, vol. 13, No. 4, Dec. 1994, pp. 725-752.

Tisse, Christel-Loïc et al., "Does resolution really increase image quality?" posted Jul. 20, 2008, 12 pages; Internet: http://www-personal.acfr.usyd.edu.au/tisse/docs/EI'08_chris_tisse.pdf.

Tisse, Christel-Loïc et al., "Extended depth-of-field (EDoF) using sharpness transport across colour channels," 2008, 12 pages; Internet: http://www-personal.acfr.usyd.edu.au/tisse/docs/OE'08_chris_tisse.pdf.

Wee, Chong-Yaw and Raveendran Paramesran, "Image Sharpness Measure Using Eigenvalues," ICSP2008 Proceedings, 30th International Conference on Software Engineering, Leipzig, Germany, May 10-18, 2008, IEEE, p. 240-243.

Burt P.J., et al., "The Laplacian Pyramid as a Compact Image Code," IEEE Transactions on Communications, 1983, vol. Com-31 (4) pp. 532-540.

Jain, Anil K., "Fundamentals of Digital Image Processing," Prentice Hall, 1989, Section 7.3, pp. 241-244.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

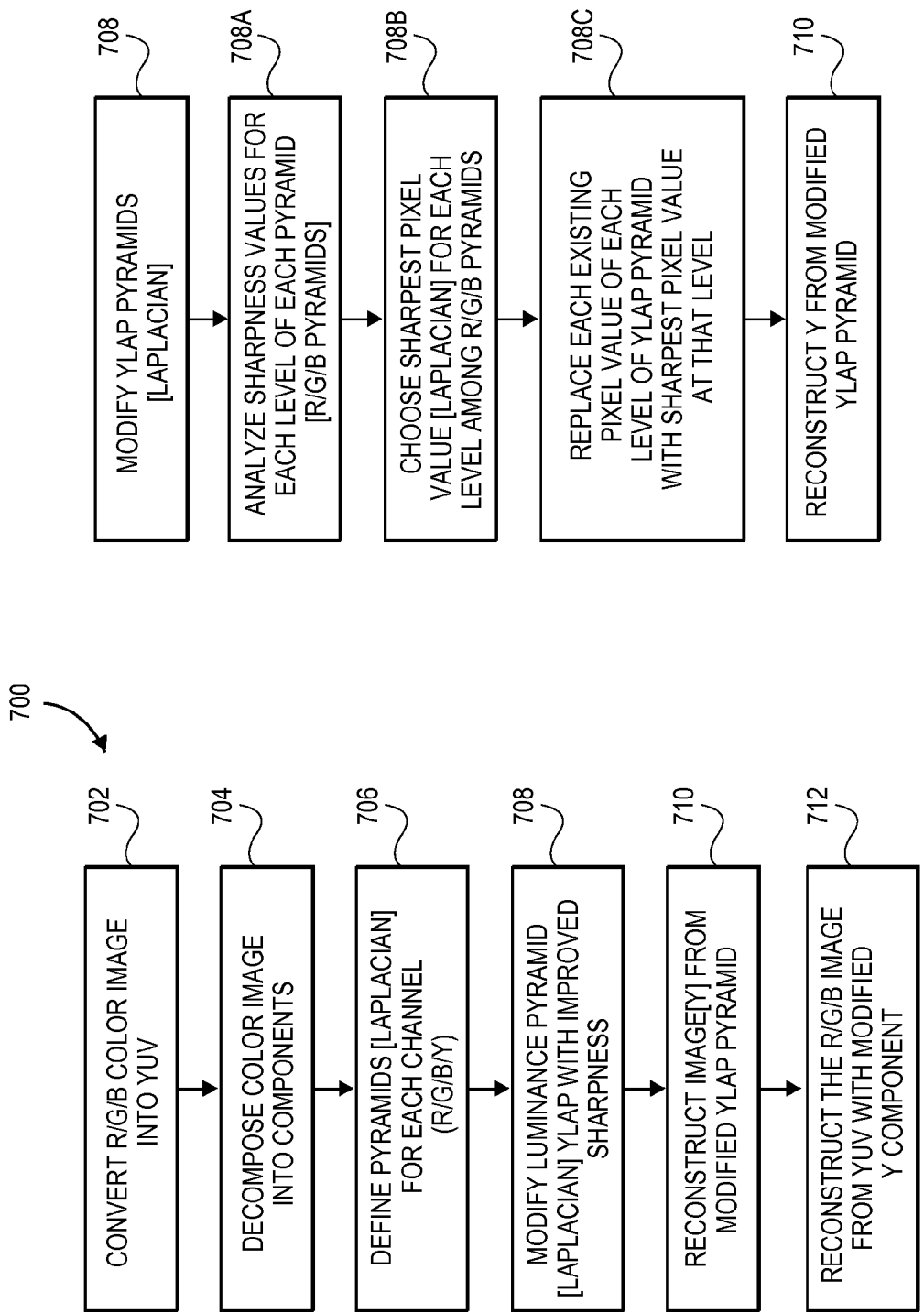

SYSTEM AND METHOD FOR MULTI-RESOLUTION SHARPNESS TRANSPORT ACROSS COLOR CHANNELS

BACKGROUND

Many methods of image sharpening exist and are ubiquitous in many applications including consumer, medical and law enforcement applications. The need for image sharpening is ever increasing in these areas, particularly in medical applications, where improved image quality is greatly desired to make such systems and devices more efficient and effective at providing results. Recently, the concept of sharpness transport across color channels has been introduced in order to improve the sharpness of images in any and all of these applications. This concept has recognized that the utilization of sharpness from all color channels of a single color image can lead to improved images. As a result, it tends to produce a more natural appearance than traditional sharpening, such as de-convolution for example. It also avoids potential motion issues encountered by other methods that require more than one image for producing a sharp image.

However, implementations of this concept are complex and expensive in practice. In these applications, the key parameters used for sharpness transport, such as the weighting coefficients, depend on lens data or calibration experiments. Furthermore, the weighting coefficients need to be determined for values of the influent parameters, such as position within the image field, object distance, light spectrum, and other parameters. In one prior system with RGB color images, a high pass filter (HP) is represented in two different channels as HPi(Cj) to denote high pass filters applied on color channel j and added to channel i with a weighting coefficients Wij $$C_{i,Out} = C_{i,In} + W_{iR} HP(C_R) + W_{iG} HP(C_G) + W_{iB} HP(C_B)$$

For many real-time applications such as surgical applications, the constant change of imaging targets and surrounding objects may require live calibration of different parameters. Addressing this need may hinder the wider application of sharpness transport. As a result, there is a need for efficient implementations that enable many real-time applications. In addition, simple sharpness transport such as those in current applications may not provide adequate sharpness improvement to provide the desired results. Also, there is a potential issue of color contamination in simple sharpness transport that would obscure an image, where color values could be borrowed from other channels along with sharpness, resulting in a sharper but color-altered image.

Thus, there exists a need in the art for improved systems and processes for sharpening color images that does not depend on lens data or calibration experiments, and that does not require weighting coefficients to be determined for each value of the influent parameters. As will be seen, the invention provides such systems and processes and in an elegant manner.

BRIEF DESCRIPTION OF THE DRAWINGS

FIGS. 6A through 7C are process flow diagrams of various embodiments of video signal processes using sharpness transport methods according to the invention.

DETAILED DESCRIPTION

Figure 1:
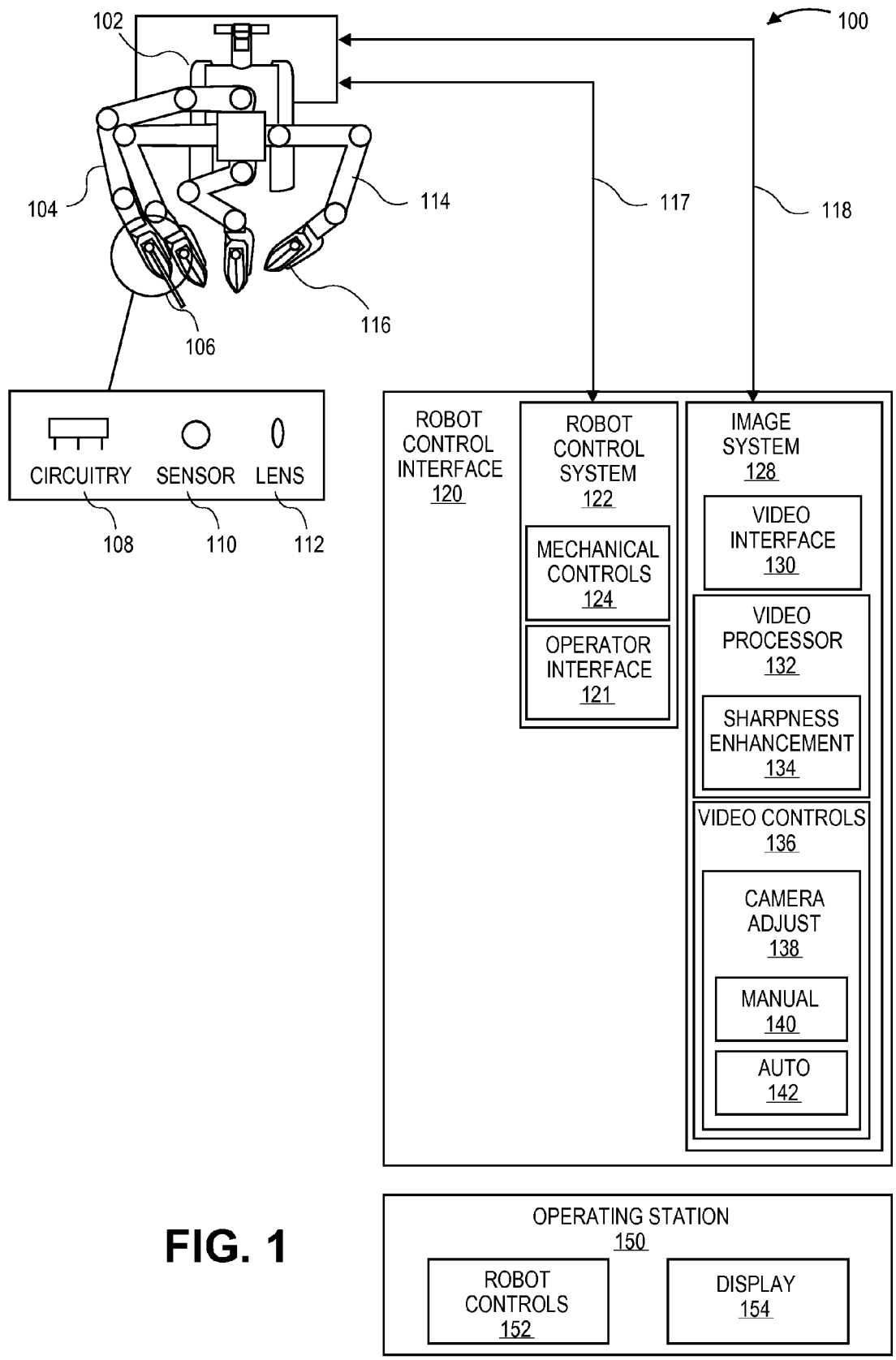
FIG. 1 is a diagrammatic view of a robotic system configured with a novel video signal processing unit configured according to the invention.

The invention is directed to a method of processing an image and improving the sharpness of a color image using a novel method of sharpness enhancement. Embodiments and examples will be described in the context of capturing video images with a surgical endoscope or similar device, where the quality of images is critical for operating physicians during surgical procedures. However, the scope of the invention is not limited to such devices in these or other embodiments, but extend to any application or environment where sharpness enhancement is desired in images, whether still or video images. Other examples may include underwater image devices, nighttime vision devices, and other devices where sharpness enhancement is desired in different applications. The invention provides ease of implementation with an efficient calculation of weighting coefficients with sharpness measurement values measured across multiple resolution levels, and also improved sharpness without compromise in color, where YUV color space is used in some embodiments for performing sharpness transport of R/G/B color images.

In one embodiment, a system is configured to capture or receive a color image having a plurality of color channels, then to define a mathematical representation, such as a pyramidal representation for example, for each color channel. A sharpness value is then measured at each color channel, possibly at multiple levels. A sharpness transport process is then performed according to the pyramid representation on each color channel, and, if the sharpness value is measured at multiple levels, then the transport process is performed at one or more of the levels in which the sharpness is measured. A sharpened color image is then generated that is based on the measured sharpness value at each color channel.

In one example, the pyramid representation is a Laplacian pyramid, and performing a sharpness transport process according to the pyramid representation includes performing a Laplacian sharpness transport process on each color channel. Thus, a Laplacian pyramid may be utilized in order to extract sharpness values from different color channels of an image, then use them to modify the image and improve its sharpness. The result is a modified image with increased sharpness.

In the following description, numerous specific details are set forth in order to provide a thorough understanding of the present invention. However, it will be apparent to one skilled in the art that the present invention can be practiced without these specific details. In other instances, well known circuits, electrical components, mechanical components, algorithms, and processes have not been shown in detail or have been illustrated in schematic or block diagram form in order not to obscure the present invention in unnecessary detail. Certain terms are used throughout the following description and Claims to refer to particular system components. As one skilled in the art will appreciate, components may be referred to by different names. This document does not intend to distinguish between components that differ in name, but not function. In the following discussion and in the Claims, the terms "including" and "comprising" are used in an open-ended fashion, and thus should be interpreted to mean "including, but not limited to . . . ".

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with applications and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Color images have more than one color channel, and different color channels can exist in different color spaces, such as R/G/B or YUV. In a natural color space such as R/G/B, each channel carries a spectral response of different spectra. And, each channel's images often have different sharpness values. This is especially true when chromatic aberration is present in the optics used for a particular image-capturing system. This is particularly true for in vivo imaging devices used in various procedures, such as endoscopes use during surgical procedures for example. The invention is directed to performing efficient sharpness transport across color channels in a color space for the purpose of sharpening color images. The efficient and effective sharpness transport is based on multi-resolution image representations of color images. In one embodiment, a process can selectively perform sharpness transport procedures in multiple levels of a channel, resulting in different levels and possibly different magnitudes of image sharpening of an image depending on the particular technique used. Various exemplary techniques and embodiments will be described below, and those skilled in the art will understand that, given this disclosure, different variations of processes or steps within a particular application or other optimizations are possible that may yield different results that are foreseeable given this disclosure.

FIG. 1 is a diagrammatic view of a robotic system configured with a novel video signal processing unit configured according to the invention. The system 100 includes a robotic unit 102 configured with robot arm(s) 104 configured to manipulate an endoscope 106. The endoscope 106 may include optical circuitry 108 and a sensor 110 and lens 112 for capturing in vivo images during surgical procedures. The endoscopes may be one of most any different configuration use in conventional and modern endoscopes known to those skilled in the art, and the invention is not limited to any particular configuration. The invention is directed to a system and related methods of signal processing of image signals, whether they are produced by any particular endoscope or other image capturing device, thus they are agnostic to any particular image capturing device.

Figure 2:
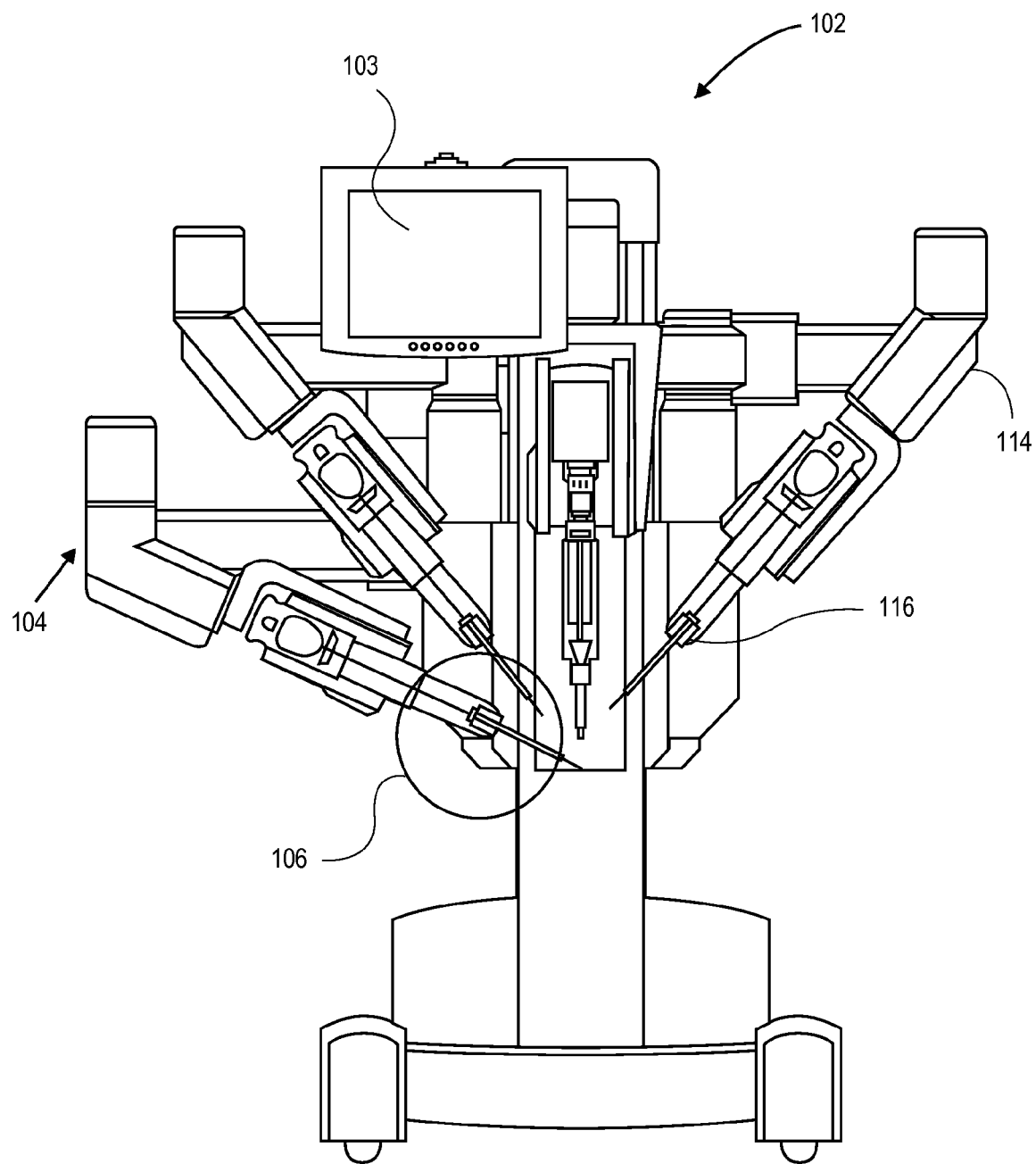
FIG. 2 is a view of an exemplary view of a robot of FIG. 1.

Other robotic arms such as arm 114 may include other surgical instruments 116, and may include one or more other in vivo cameras or specialized instruments (not shown) for viewing internal surgical procedures and for moving and manipulating the surgical instruments and cameras. FIG. 2 shows a front view of an exemplary robot 102 having a display 103, robot arms 104, 114, and instruments 106 (endoscope), 116 (other instrument).

Referring again to FIG. 1, the robot 102 may further include communication lines for robotic control and feedback signals 117 and for imaging control and transmission 118 that communicate with a robot control interface 120. Though this control interface 120 is shown as a separate component, it could be incorporated into a singular or modular system together with the robot 102 and other components described below.

In this example, the robot control interface 120 receives robot control signals from the robot 102 via communication line 117 to a robot control system 122. The control system 122 may include mechanical controls 124 such as logic control circuits, control software and other related hardware or software components that provide the necessary control of the robot arms and other components for use in surgery. The operator interface 126 is configured to receive operation instructions from an operator of the robot, such as from an operator station 150 described below. The robot control interface 120 may further include image system 128 that receives image data through communication line 118. The image system 128 includes video interface 130 configured to interface with the image capture device, such as an endoscope, to receive video data in analog or digital form for use in processing. Though these features may be incorporated into the endoscope itself, the image system may include analog to digital conversion circuitry (well known in the art, not shown). Once the video signal is digitized, the digital values may be processed in video processor 132. Among other features, the video processor includes a sharpness enhancement module 134 configured to improve the sharpness in an image using the sharpness values among the various channels.

According to one embodiment, the digital signal is divided into multiple channels, such as the R/G/B (red, green, blue) channels for example, where each channel has original value and other derived values such as sharpness measurement or value. For each channel, the sharpness value is compared to the sharpness values in other channels, and the original value for a particular channel can be modified according to the values of the other channels.

The system further includes an optional video controls module 136 configured to control the video operations of endoscope 106. The controls may include a camera adjust 138 configured to allow an operator to adjust various settings in the endoscope, whether manually using manual adjustment module 140 or automatic adjustment module 142, and they also may work in conjunction with the video processor module 132, where image adjustments may be used to enhance the video and override any video controls.

An operator station 150 is configured for a user to control the operations of the robot. The station includes robot controls 152 operable by a user for manually controlling the robotic arms 104, 114. The display 154 gives the user a view from the endoscope 106 and possibly other views of the robot arms and tools 116 during surgical procedures.

According to the invention, improved image displays on display 154 is possible with improved sharpness resulting from novel image processing systems and techniques, described in further detail below.

Figure 3:
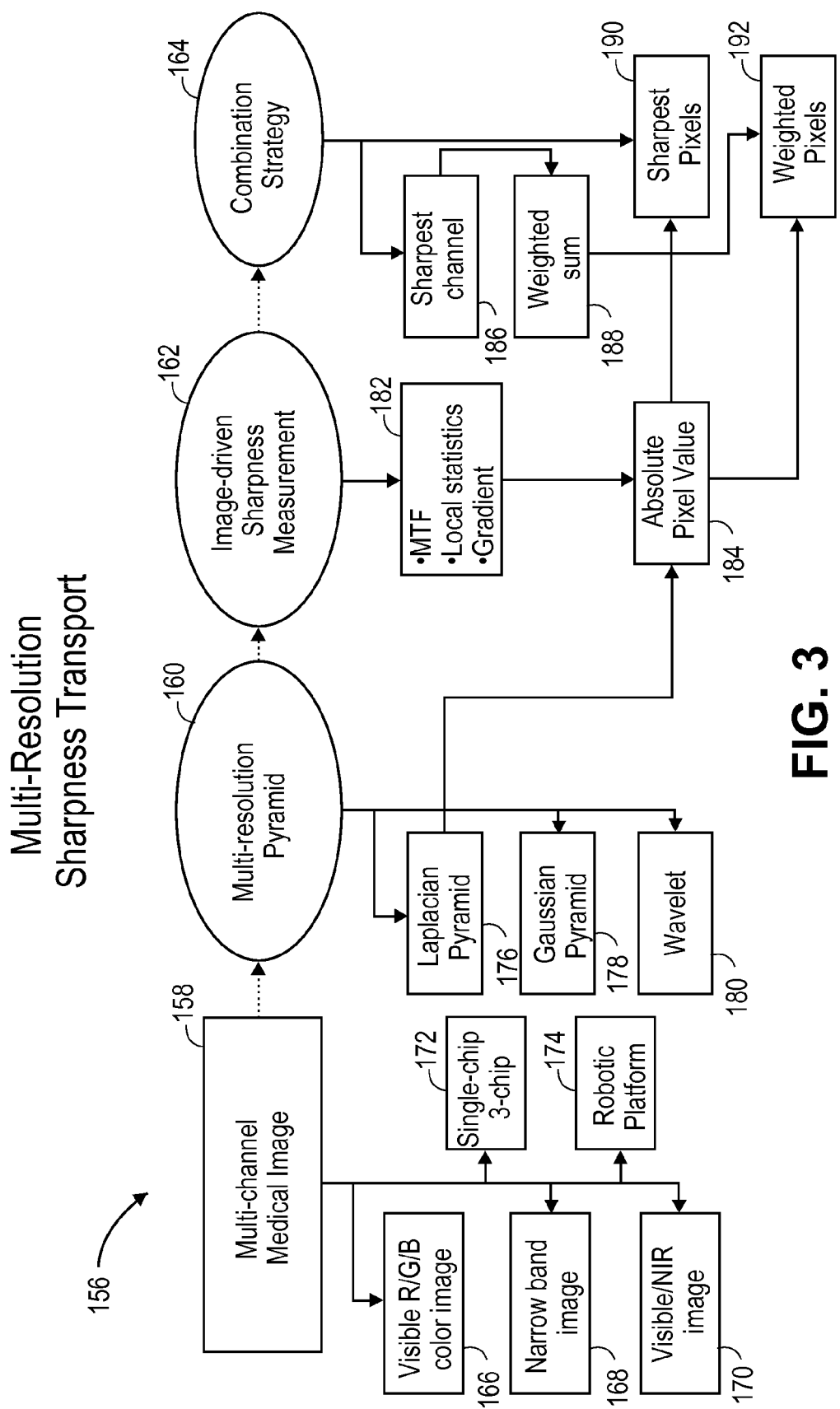
FIG. 3 is a flow chart illustrating exemplary implementations with different imaging platforms of sharpness transport according to the invention.

Referring to FIG. 3, a flow chart 156 illustrating the system and process aspects and optional features of systems and processes configured according to the invention. In operation, a multi-channel image 158, such as a medical image for example, is captured or received and processed in the system 156, and the image's sharpness is enhanced using novel and effective methods that overcome the shortcomings of the prior art discussed above. The image may be decomposed here, which may be simple or complex as discussed in more detail below. The image is then represented in a multi-resolution representation such as a transformation representation for example or other mathematical operation 160, followed by an image-driven sharpness measurement 162. These values are then combined in step 164 in a novel way to improve the sharpness of an image to produce an improved image. The process may work on a visible R/G/B image 166, a narrow band image 168, or a visible or a NIR (near infrared) image 170. The process may operate on a single or multiple chip platform 172, and may operate on a robotic platform 174, such as a robotic system for use in surgery or other medical applications. The image is then processed by first calculating the sharpness and possibly other values in a mathematical representation, such as a Laplacian Pyramid 176, a Gaussian Pyramid 178, and/or a wavelet representation 180 (For wavelet representation, please refer to the following reference: A. Laine, S. Schuler, F. Jian and W. Huda, "Mammographic feature enhancement by multiscale analysis," IEEE Transaction on Medical Imaging, Vol. 13, 1994.) An image driven sharpness measurement 162 then measures using MTF (modulation transfer function), local statistics or image gradient to measure sharpness values among the multiple channels 182, and produces a maximum sharpness value (For local eigenvalue based image sharpness measurement, please refer to the following references: C. Wee and R. Paramesran, "Measure of image sharpness using eigenvalue," Journal of Information Science, vlo 177, 2007; For sharpness metrics in a wavelet representation please refer to the following reference: R. Ferzli and L. Karam, "A Robust Image Sharpness Metric Based on Kurtosis Measurement of Wavelet Coefficients," Int Workshop on Video Processing and Quality Metrics, 2005). These sharpness values may then be combined with the original values in various ways according to the invention to produce an improved image.

Figure 4:
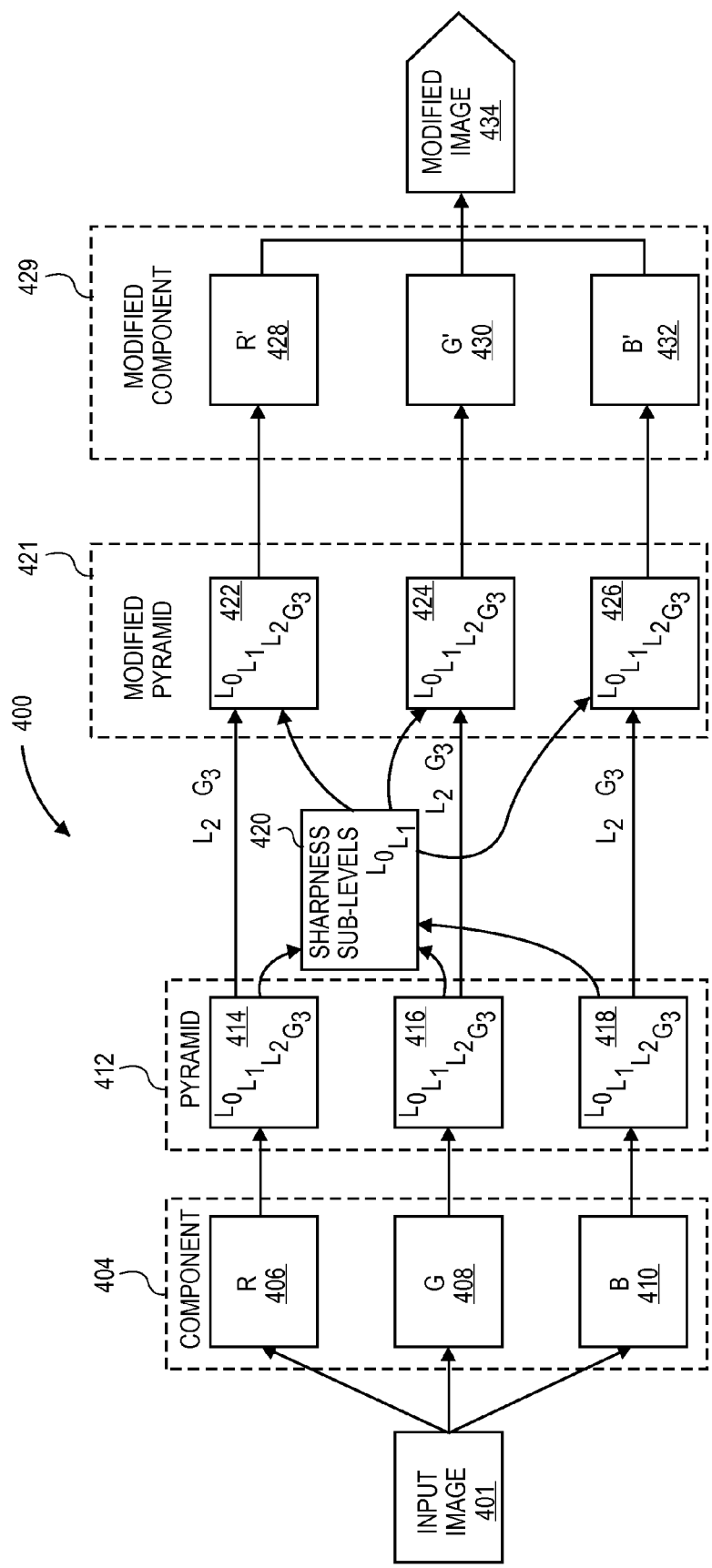
FIG. 4 is another diagrammatic view of a video signal processing unit shown in FIG. 1.

For an image transformed into a multi-resolution Laplacian Pyramid, a sharpness value could be simply the absolute value of the pixel value 184 of a given pixel location at each resolution level L except the top level at L=3, for example (At top level, it would be a subsampled Gaussian image G3 with the lowest resolution, FIG. 4). To be more specific, a color image is first decomposed into a plurality of color components and each component is transformed to unsharpened multi-resolution Laplacian representation via smoothing, subtraction, and subsampling (Details can be found in the following reference: P. Burt and T. Adelson, "The Laplacian Pyramid as a Compact Image Code", IEEE Trans. Communications, 9:4, 532-540, 1983). And then sharpness transport is carried out in each resolution level prior to final transformation back to a sharpened color image. At each resolution level, different combinations are possible, including taking a value from the sharpest channel 186 alone or in combination with a weighted sum 188 to combine what is deemed the sharpest pixels 190 and/or weighted pixels 192. The result is a significantly improved image as a result of improved sharpness.

Thus, in one example, an image sharpening method is provided that involves capturing an image, and then decomposing the image into a plurality of image-representation components, such as RGB components for example, which may be simple or more complex as discussed below. Then, each image-representation component is transformed to obtain an unsharpened multi-resolution representation for each image-representation component. This may be a combined set of representation levels, or a "pyramid" of all the Laplacian/wavelet levels.

Here, a multi-resolution representation includes a plurality of transformation level representations. This may be the levels L0, L1, etc. and is not limited to Laplacian levels for example. The term "transformation level representation" is therefore broad. The method further includes transporting sharpness information from an unsharpened transformation level representation of a first one of the image-representation components to a transformation level representation of an unsharpened multi-resolution representation of a second one of the image-representation components to create a sharpened multi-resolution representation of the second one of the image-representation components. The sharpened multi-resolution representation of the second one of the image-representation components is then transformed back to obtain a sharpened image. The sharpened image may then be displayed.

In different examples, variations on the general process may be used in different applications. In one example, capturing the image may include illuminating a scene to be imaged with narrow band illumination, infrared illumination or wide band illumination. In another example, capturing the image may include using a single image capture area on an integrated circuit device to capture the image, using a plurality of integrated circuit devices in a single camera to capture the image, or using a plurality of cameras to capture the image. The image may include near infrared spectrum features and/or visible spectrum features. The image may also include visible spectrum features and an X-Ray feature that is beyond visible spectrum (i.e., the image may be a multi-modal image, with various components, such as from the visible, IR, X-ray, ultrasound, MRI, etc.).

In the case of multi-camera, an image may consist of image components captured by cameras that are not optically aligned. As a result, capturing the image may include a step of aligning the image components so that the pixels at the same location [x, y] from each image component correspond to the same location in the scene being imaged (For details of image alignment, please refer to the following reference: Lisa Brown, "A survey of image registration techniques," ACM Computing Surveys, Volume 24, Issue 4, December 1992).

Decomposing the image into a plurality of image-representation components may include performing a color space transform. Performing the color space transform may include transforming RGB image-representation components to YUV image-representation components. The plurality of image-representation components may include RGB image-representation components as well as other components. A first one of the image-representation components may include information from a near infrared spectrum feature of the image and a second one of the image-representation components comprises information from a visible spectrum feature of the image. The transformation level representations comprise Laplacian representations or other representations, and they also may include wavelet representations.

The process may further include transporting sharpness information from a second unsharpened transformation level representation of the first one of the image-representation components to a second transformation level representation of the unsharpened multi-resolution representation of the second one of the image-representation components to create the sharpened multi-resolution representation of the second one of the image-representation components. Referring again to the description above, this may include transporting sharpness information from multiple levels, e.g., L1 to L1 and L0 to L0, as discussed above and illustrated in FIGS. 4 and 5. In still further examples, the sharpness information may be image-driven, and the image driven sharpness information may further be gradient based or based on local statistics—such as Eigen values or Kurtosis for example.

In yet another example, the sharpness information may further include the sharpest sharpness information selected from each of the unsharpened multi-resolution representations for each image-representation component, and the sharpened image may include an RGB image.

In yet another example, the process may further include transforming the unsharpened multi-resolution representation for the first one of the image-representation components and the sharpened multi-resolution representation of the second one of the image-representation components to obtain the sharpened image. In the example above, the sharpened image does not necessarily come from anything other than the sharpened multi-resolution representation. In this other example, the sharpened image may come from both the unsharpened and sharpened multi-resolution representations. And, the sharpened image may include an RGB image.

The process may also allow for a user to select the sharpness level, either manually or otherwise, where the process includes selecting a first sharpness state or a second state of the sharpened image in response to a sharpness selection input, wherein for the first sharpness state, sharpness information is transported from a first number of unsharpened transformation level representations. For the second sharpness state, sharpness information may be transported from a second number, different from the first number, of unsharpened transformation level representations.

In yet another example, the transformation level representations may include Laplacian transformation level representations, wherein the sharpness information comprises an absolute value of pixel values in the unsharpened transformation level representation of the first one of the image-representation components.

FIG. 4 is a process flow diagram of a video image enhancement process 400 according to one embodiment. This unit illustrated in FIG. 2 may be processed by a microprocessor, FPGA, or other controller, and may include operations to be performed by hardware, firmware, or software, or other circuitry or combination thereof. The input image 402 is divided into three components 404: Red 406, Green 408 and Blue 410. In this example, a pyramid 412, such as a Laplacian pyramid for example, is constructed for each color channel 414, 416 and 418 of an input color image. In this example, there are several levels of the pyramid, $L_0$, $L_1$, $L_2$, $G_3$, where most levels are Laplacian images (e.g., L1) in that level except for the top level $G_3$ is a Gausian level image. This top level $G_3$ is the lowest resolution level and the bottom level $L_0$ is the highest resolution level. The Laplacian images at each level can be used as sharpness images that provide sharpness measurement values for each pixel. The sharpness value is simply the absolute value of the pixel value.

In one embodiment, sharpness transport can be easily accomplished by comparing Laplacian images and selecting the sharpest pixels with largest absolute values at each level across multiple color channels. Then, creating sharpest sub-levels, such as $L_0$, $L_1$, with sharpest pixels, in this example. Modified pyramids 421 are then created for each color channel by combining the common sharpest sub-levels with its own upper-levels, L2, G3, in this example, giving modified pyramids 422, 424 and 426 with their respective levels $L_0$, $L_1$, $L_2$, $G_3$. Modified components 429, including R' 428, G' 430 and B' 432, are generated, and a modified image 434, a sharpened color image, is constructed from the modified Laplacian pyramids.

Figure 5:
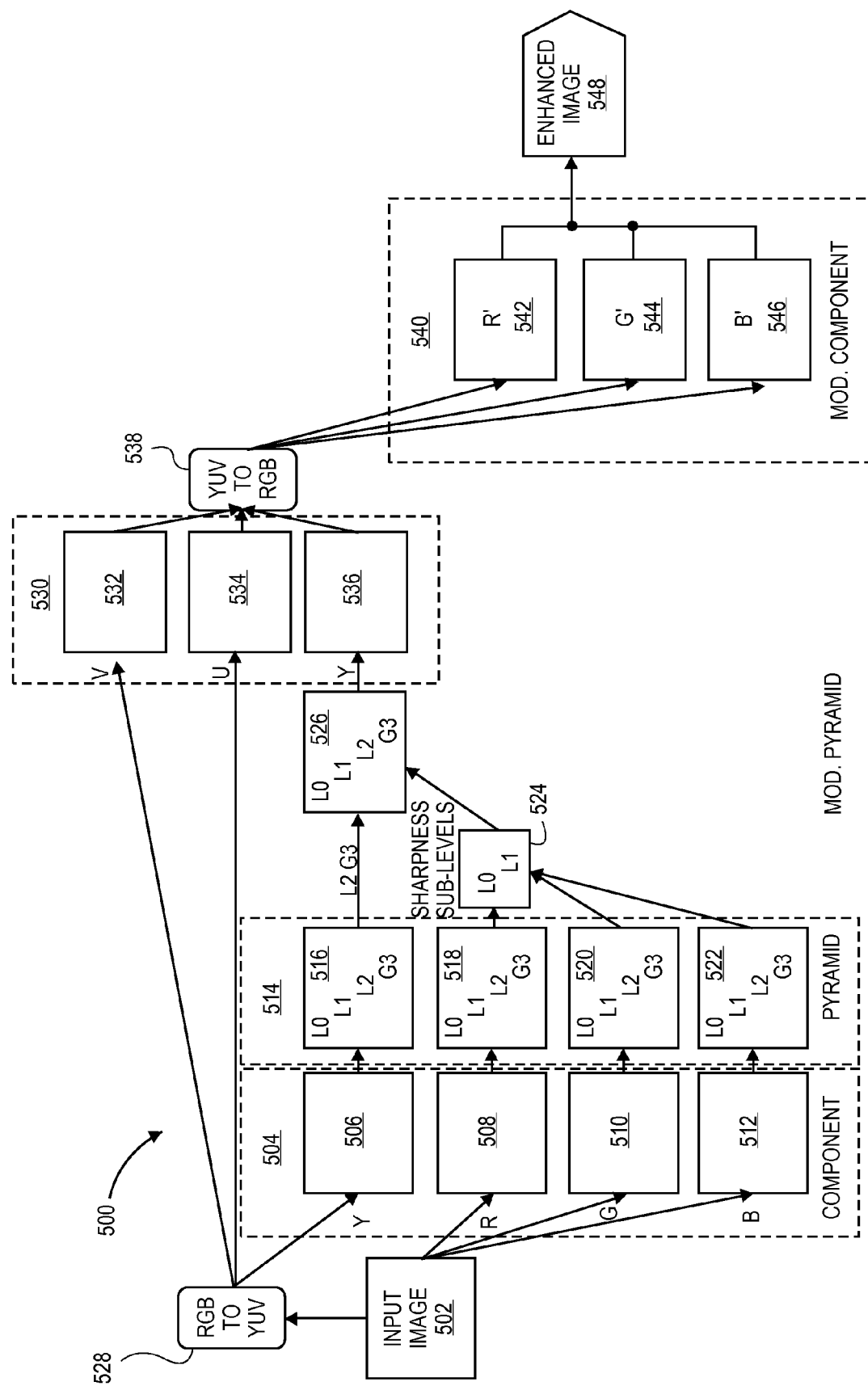
FIG. 5 is a diagrammatic view of an alternative video signal processing unit to that shown in FIG. 4.

In some application, a potential issue may exist with directly working on the color channels of a color image. In some instances, sharpness transport in red, green or blue channels may alternate the color perception of the original color image. This may be more pronounced when multi-level sharpness transport is employed. In one embodiment, this problem is addressed by avoiding the altering of the color while sharpening images. This may be accomplished by operating in a different color space, the YUV or YCbCr color space for example. The YUV space is defined in terms of color space of one luma (Y) or luminance component for perceptual brightness, and the two chrominance (UV) components for color information, and is the color model used in the NTSC, PAL and SECAM composite color video standards and modern video compression standards. Referring to FIG. 5, one exemplary method 500 is illustrated to address this, where the input video image 502 is converted from R/G/B (red/green/blue) color space to YUV color space. The R/G/B components are converted similar to the way they were in the example above 528. The input image 502 is divided into three components 504: Red 508, Green 510 and Blue 512. In this example, a pyramid 514, such as a Laplacian pyramid for example, is constructed for each color channel 518, 520 and 522 of an input color image. In this example, there are several levels of the pyramid, $L_0$, $L_1$, $L_2$, $G_3$, where $G_3$ is a Gaussian level, the lowest resolution image level. According to this embodiment, the Laplacian images at each level can be used as sharpness images with simple absolute value operation to provide sharpness measurement values for each pixel.

Like embodiment described above with FIG. 4, sharpness transport can be easily accomplished by comparing Laplacian images and selecting the sharpest pixels with largest absolute pixel values at each level across multiple color channels, as illustrated in the alternative embodiment of FIG. 5. Then, sharpest sub-levels, such as $L_0$, $L_1$ in this example, with sharpest pixels are created. In one embodiment, the absolute value for each pixel value is calculated and then compared in order to output one or more sharpest pixel values for one or more levels of the pyramids of each color component. For example, the sharpest component consisting of sharpest pixels can be generated for each level by selecting pixels with the maximum sharpness value from the three color channels.

Again, according to this embodiment, the color space is converted from the original color space into another desired color space, in this example, from R/G/B space to YUV space in 528. The input image is separately converted from R/G/B to YUV. Once the image data is defined in the YUV color space, sharpness transport can be performed for the luminance (brightness) component. In this embodiment, only the luminance component Y is defined in a pyramid, not the chrominance (color) components U, V. Converted image data is produced in 528, and the output includes color components U and V, and a Y luminance image component that is one component 506 that is defined in multiple levels $L_0$, $L_1$, $L_2$, $G_3$ like the R/G/B components, and a pyramid 516, such as a Laplacian pyramid for example, is created for the luminance Y together with the pyramids for R/G/B in 514. Next, sharpness transport is performed.

Like the other embodiment discussed above, the three components 508, 510 and 512 of the R/G/B space are converted to pyramids of various levels $L_0$, $L_1$, $L_2$, $G_3$, shown here as pyramids 518, 520 and 522. These three pyramids are used to calculate sharpness values among the various sub-levels as described above, and those skilled in the art will understand that others are possible given this disclosure. The new pyramid of sharpness values 524 generated from this process is then combined with the pyramid 516 of the Y luminance pyramid to produce the composite pyramid 526. In this example, the bottom levels $L_0$, $L_1$, are incorporated from the R/G/B pyramid 524 into the composite pyramid 526, and top levels $L_2$, $G_3$ are incorporated from the Y luminance pyramid 516. Those skilled in the art will understand that other combinations and permutations are possible given this disclosure, but the general concept of combining these two pyramids would still be fundamental to any such process. Thus, the Y luminance pyramid 516 together with the combined R/G/B pyramid 524 is combined to produce a modified Y luminance pyramid 536. The resulting YUV components 530 would then include the V and U components from the conversion from R/G/B to YUV, and the modified Y luminance component 536.

After sharpness transport, the modified Y and unmodified UV may be converted back to R/G/B color space to obtain the final color image. The process then can convert the YUV components to R/G/B color space in 538, giving modified components 540 in the R/G/B space, including components R' 542, G' 544 and B' 546. An enhanced image 548 is then output.

Thus, the sharpness transport is accomplished using the Y component from the conversion by combining the one pyramid, such as a Laplacian pyramid, for the Y component in addition to the three Laplacian pyramids for R/G/B. In one embodiment, when modifying the Y pyramid, a weighted sum of this value and the sharpest pixel value from each of the sublevels can be used to set the value for the Y pyramid. Modified YUV components can then be produced, converted to R/G/B color space, and an enhanced image can be produced with improved sharpness.

Referring to FIGS. 6A-7C, process flow charts are provided to further clarify different embodiments of the invention.

Figure 6B:
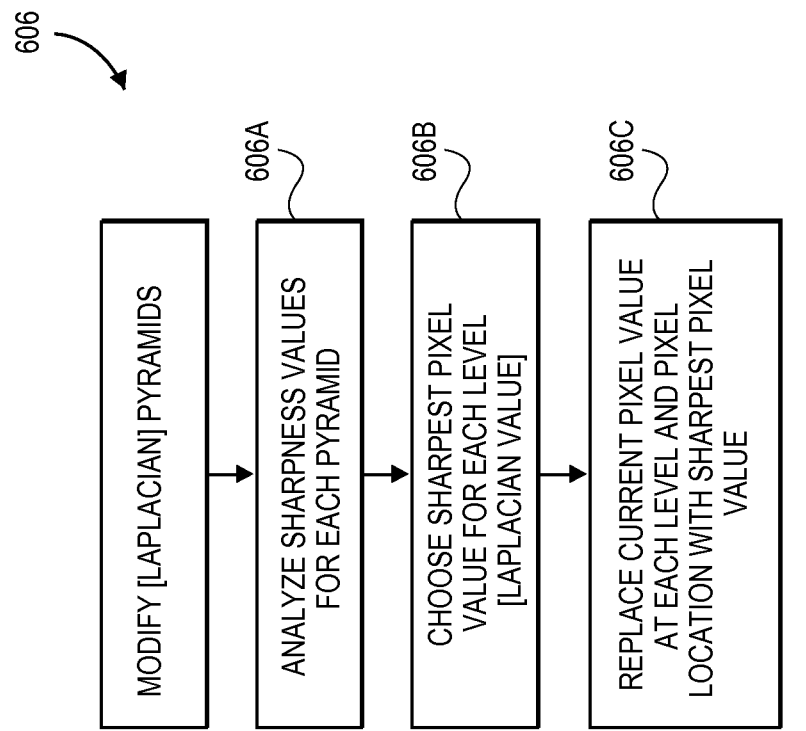
Figure 6A:
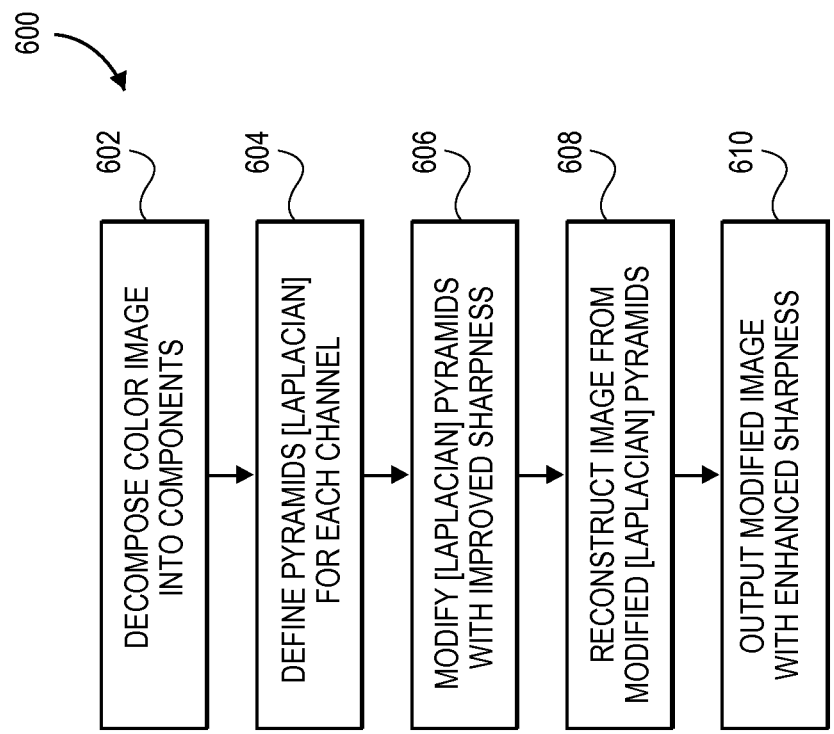

Referring first to FIG. 6A, a sharpness transport process 600 is illustrated, beginning with first decomposing or otherwise defining the color image into separate components, such as their R/G/B color components on some embodiments or YUV components in other embodiments, in Step 602. Pyramid values are then defined, such as Laplacian pyramids for example, for each color channel in Step 604. In Step 606, the pyramids are modified at one or more levels to improve sharpness values. Referring to FIG. 6B, a more detailed example of the process Step 606 for modifying the pyramids (possibly Laplacian for example) is shown. In Step 606A, the sharpness values are analyzed for each pyramid. In Step 606B, the process chooses the channel with highest sharpness value for each level at each pixel location.

In this step, the sharpness value may be the absolute value of the Laplacian value for the pyramid in the case where a Laplacian pyramid is used. In Step 606C, we replace the current pixel value CLi[x, y] at each level L with the sharpest pixel value CLs[x, y], $$C^L_{i,out}[x,y]=C^L_s[x,y]$$

where s[x,y] indexes the sharpest channel at location [x, y] among all channels at level L based on the sharpness values. For Laplacian pyramid, sharpness values are simply the absolute values of pixel values.

Figure 6C:
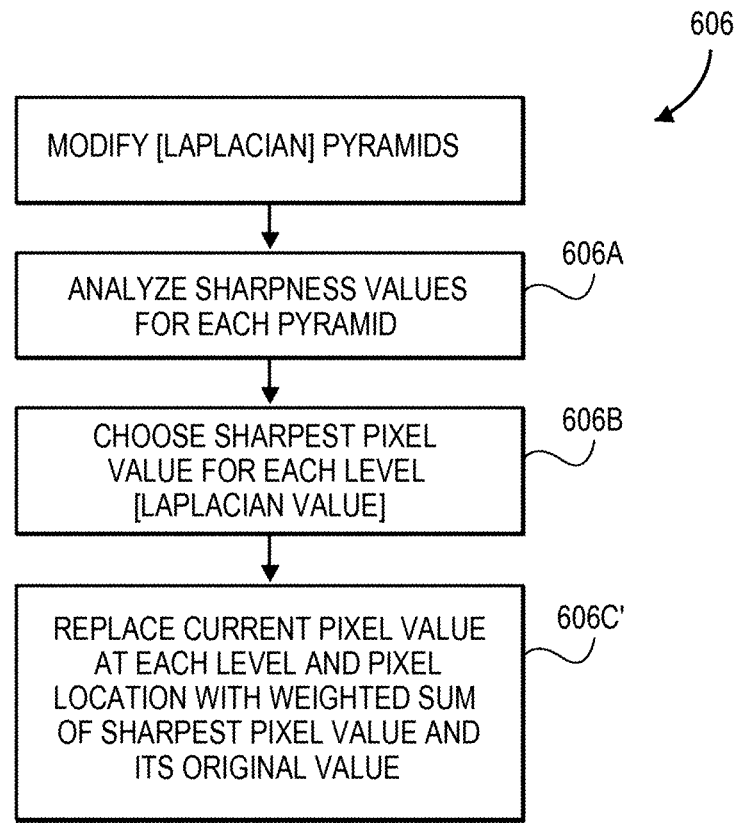

FIG. 6C illustrates yet another possibility, with the other steps remaining the same, while Step 606C' is different. In this step, the desired value is determined by calculating a weighted value sum of the value of the chosen pixel that has the highest sharpness value among all channels of the same level, added together with the original value at a given channel. For example, the pixel value CLi,out[x, y] of an enhanced color channel i at each level L in the sharpened multi-resolution Laplacian representation could be the sum of 0.5 of its original value $C^L_i[x, y]$ and 0.5 of the sharpest pixel $C^L_s[x, y]$ at the same pixel location [x, y]

$$C^L_{i,out}[x,y]=0.5*C^L_i[x,y]+0.5*C^L_s[x,y]$$

This resulting value provides sharpness transport among the channels by leveraging the different sharpness values at given levels among the different channels.

Referring back to FIG. 6A, after Step 606, the image can be reconstructed from the modified pyramids in Step 608, and the modified image is produced with enhanced sharpness in Step 610.

Referring to FIG. 7A, an alternative sharpness transport process 700 is illustrated, beginning with first converting the R/G/B color components to YUV components in Step 702. The next step, Step 704, is decomposing or otherwise defining the color image into separate components, such as their R/G/B color components and the YUV. Pyramid values are then defined, such as Laplacian pyramids for example, for each R/G/B color channel in Step 706 to give YLap and R/G/B pyramids. In Step 708, the YLap pyramid is modified at one or more levels to improve sharpness values. Referring to FIG. 7B, a more detailed example of the process Step 708 for modifying the pyramids (possibly Laplacian for example) is shown. In Step 708A, the sharpness values are analyzed for each R/G/B pyramid. In Step 708B, the process chooses the sharpest pixel value for each level. In this step, the sharpness measure may be the absolute value of the Laplacian value for the pyramid in the case where a Laplacian pyramid is used. In Step 708C, we replace the current pixel value $Y^L[x, y]$ at each level L with the pixel determined to be the sharpest among all pixels at the same location [x, y] from all color channels, $$Y^L_{out}[x,y]=C^L_s[x,y]$$

Figure 7C:
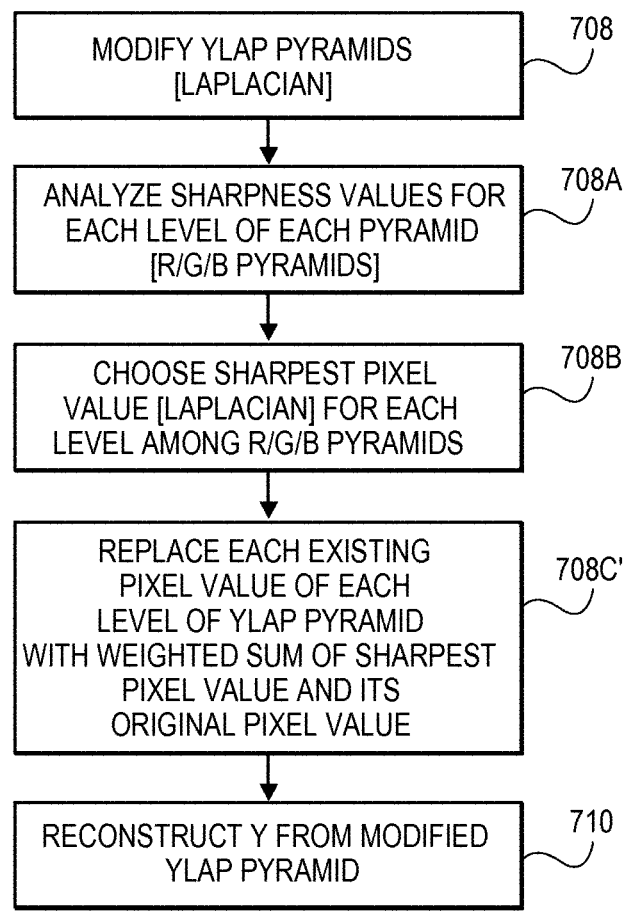

FIG. 7C illustrates yet another possibility, with the other steps remaining the same, while step 708C' is different. In this step, the desired value is determined by calculating a weighted value sum of the sharpest pixel value added together with the original value at a given channel. For example, the pixel value $Y^L_{out}[x, y]$ of an enhanced luminance channel at each level L in the sharpened multi-resolution Laplacian representation could be the sum of 0.5 of its original value $Y^L[x, y]$ and 0.5 of the sharpest pixel $C^L_s[x, y]$, $$Y^L_{out}[x,y]=0.5*Y^L[x,y]+0.5*C^L_s[x,y]$$

This resulting value provides sharpness transport among the channels by leveraging the different sharpness values at given levels among the different channels.

Referring back to FIG. 7A, after Step 708, the image can be reconstructed from the modified YLap pyramids in Step 710, and the modified image is reconstructed from the YUV color space produced with enhanced sharpness in Step 712.

While certain exemplary embodiments have been described and shown in the accompanying drawings, it is to be understood that such embodiments are merely illustrative of and not restrictive on the broad invention as defined in the appended Claims and other Claims that may be later presented, and that this invention is not limited to the specific constructions and arrangements shown and described, since various other modifications may occur to those ordinarily skilled in the art. Hence, alternative arrangements of modules, process steps, data conversions, robots and their components, interfaces, operating stations, and other components can occur without departing from the spirit and scope of the invention. Similarly, components not explicitly mentioned in this specification can be included in various embodiments of this invention without departing from the spirit and scope of the invention. Also, functions and logic described as being performed in certain components in various embodiments of this invention can, as would be apparent to one skilled in the art, be readily performed in whole or in part in different order or sequence, different components or in different configurations of components not explicitly mentioned in this specification, without departing from the spirit and scope of the invention. Accordingly, the specification and drawings are to be regarded in an illustrative rather than a restrictive sense.

Reference in the specification to "an embodiment," "one embodiment," "some embodiments," "various embodiments" or "other embodiments" means that a particular feature, structure, or characteristic described in connection with the embodiments is included in at least some embodiments, but not necessarily all embodiments. References to "an embodiment," "one embodiment," or "some embodiments" are not necessarily all referring to the same embodiments. If the specification states a component, feature, structure, or characteristic "may," "can," "might," or "could" be included, that particular component, feature, structure, or characteristic is not required to be included. If the specification or Claims refer to "a" or "an" element, that does not mean there is only one of the element. If the specification or Claims refer to an "additional" element, that does not preclude there being more than one of the additional element.

For purposes of illustration, programs and other executable program components are shown herein as discrete blocks, although it is understood that such programs and components may reside at various times in different storage components of computing devices, and are executed by processor(s). Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

As discussed herein, the invention may involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the systems and methods described herein facilitate analysis and enhancement of video images. Although the components and modules illustrated herein are shown and described in a particular arrangement, the arrangement of certain components and modules may be altered to perform novel operations in different locations in the system, and may even be remote from other components. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

We claim:
1. An image sharpening method comprising:
capturing an image;
decomposing, by an image system, the image into a plurality of image-representation components;
transforming, by the image system, each image-representation component of the plurality of image-representation components to obtain an unsharpened multi-resolution representation for each image-representation component, wherein a multi-resolution representation comprises a plurality of transformation level representations;
transporting, by the image system, sharpness information from an unsharpened transformation level representation of a first one of the plurality of image-representation components to a same transformation level representation of an unsharpened multi-resolution representation of a second one of the plurality of image-representation components to create a sharpened multi-resolution representation of the second one of the image-representation components, wherein the transported sharpness information modifies sharpness information in the same transformation level representation of the unsharpened multi-resolution representation of the second one of the plurality of image-representation components;
transforming, by the image system, the sharpened multi-resolution representation of the second one of the plurality of image-representation components to obtain a sharpened image; and
displaying the sharpened image on a display device.

2. The method of claim 1:
wherein the capturing the image comprises illuminating a scene to be imaged with narrow band illumination.

3. The method of claim 1:
wherein the capturing the image comprises illuminating a scene to be imaged with infrared illumination.

4. The method of claim 1:
wherein the capturing the image comprises illuminating a scene to be imaged with wide band illumination.

5. The method of claim 1:
wherein the capturing the image comprises illuminating a scene to be imaged with X-Ray illumination.

6. The method of claim 1:
wherein the capturing the image comprises capturing the image with a single image capture area on an integrated circuit device.

7. The method of claim 1:
wherein the capturing the image comprises capturing the image with a plurality of integrated circuit devices in a single camera.

8. The method of claim 1:
wherein the capturing the image comprises capturing each image component of the image with a different camera in a plurality of cameras.

9. The method of claim 8, the capturing the image further comprising:
aligning the image components captured with the plurality of cameras.

10. The method of claim 1:
wherein the image comprises near infrared spectrum features and visible spectrum features.

11. The method of claim 1:
wherein the image comprises X-Ray.

12. The method of claim 1:
wherein decomposing the image into a plurality of image-representation components comprises performing a color space transform.

13. The method of claim 12:
wherein performing the color space transform comprises transforming RGB image-representation components to YCbCr image-representation components.

14. The method of claim 1:
wherein the plurality of image-representation components comprises RGB image-representation components.

15. The method of claim 1:
wherein one of the plurality of image-representation components comprises information from a near infrared spectrum feature of the image and another one of the plurality of image-representation components comprises information from a visible spectrum feature of the image.

16. The method of claim 1:
wherein the transformation level representations comprise Laplacian representations.

17. The method of claim 1:
wherein the transformation level representations comprise wavelet representations.

18. The method of claim 1 further comprising:
transporting sharpness information from a second unsharpened transformation level representation of the first one of the plurality of image-representation components to a second transformation level representation of the unsharpened multi-resolution representation of the second one of the plurality of image-representation components to create the sharpened multi-resolution representation of the second one of the plurality of image-representation components.

19. The method of claim 1:
wherein the sharpness information is image-driven.

20. The method of claim 19:
wherein the image-driven sharpness information is gradient-based.

21. The method of claim 19:
wherein the image-driven sharpness information is based on local statistics.

22. The method of claim 21:
wherein the local statistics comprise kurtosis and/or eigenvalues.

23. The method of claim 1:
wherein the sharpness information comprises sharpest sharpness information selected from each of the unsharpened multi-resolution representations for each image-representation component of the plurality of image-representation components.

24. The method of claim 1:
wherein the sharpened image comprises an RGB image.

25. The method of claim 1, further comprising:
transforming the unsharpened multi-resolution representation for the first one of the plurality of image-representation components and the sharpened multi-resolution representation of the second one of the plurality of image-representation components to obtain the sharpened image.

26. The method of claim 25:
wherein the sharpened image comprises an RGB image.

27. The method of claim 1:
wherein the sharpness information in the transformation level of the sharpened multi-resolution representation of the second one of the plurality of image-representation components comprises a weighted sum that includes the sharpness information from the unsharpened multi-resolution representation for the first one of the image representation components and sharpness information from the unsharpened multi-resolution representation for the second one of the image representation components.

28. The method of claim 1, further comprising:
selecting, by the image system, a first sharpness state or a second sharpness state of the sharpened image in response to a sharpness selection input;
wherein for the first sharpness state, sharpness information is transported from a first number of unsharpened transformation level representations; and
wherein for the second sharpness state, sharpness information is transported from a second number, different from the first number, of unsharpened transformation level representations.

29. The method of claim 1:
wherein the transformation level representations comprise Laplacian transformation level representations; and
wherein the sharpness information comprises an absolute value of pixel values in the unsharpened transformation level representation of the first one of the plurality of image-representation components.

* * * * *